US008625950B2

(12) United States Patent
Beamon et al.

(10) Patent No.: US 8,625,950 B2
(45) Date of Patent: Jan. 7, 2014

(54) ROTARY LOCKING APPARATUS FOR FIBER OPTIC EQUIPMENT TRAYS AND RELATED METHODS

(75) Inventors: Hubert B. Beamon, Haltom City, TX (US); Terry L. Cooke, Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 707 days.

(21) Appl. No.: 12/641,617

(22) Filed: Dec. 18, 2009

(65) Prior Publication Data
US 2011/0150407 A1 Jun. 23, 2011

(51) Int. Cl.
G02B 6/00 (2006.01)
(52) U.S. Cl.
USPC .......................................... 385/135; 312/222
(58) Field of Classification Search
USPC .......................................... 385/135; 312/222
See application file for complete search history.

(56) References Cited

U.S. PATENT DOCUMENTS

| | | |
|---|---|---|
| 620,013 A | 2/1899 | Barnes |
| 2,614,685 A | 10/1952 | Miller |
| 3,175,873 A | 3/1965 | Blomquist et al. |
| 3,212,192 A | 10/1965 | Bachmann et al. |
| 3,433,886 A | 3/1969 | Myers |
| 3,568,263 A | 3/1971 | Meehan |
| 3,646,244 A | 2/1972 | Cole |
| 3,880,396 A | 4/1975 | Freiberger et al. |
| 3,906,592 A | 9/1975 | Sakasegawa et al. |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |

(Continued)

FOREIGN PATENT DOCUMENTS

| | | |
|---|---|---|
| CA | 2029592 A1 | 5/1992 |
| CA | 2186314 A1 | 4/1997 |

(Continued)

OTHER PUBLICATIONS

Page-Numbered Consolidation of NPL submitted by Applicant on Dec. 28, 2012.*

(Continued)

*Primary Examiner* — Charlie Peng
*Assistant Examiner* — Peter Radkowski

(57) ABSTRACT

A rotary locking apparatus for locking and unlocking a fiber optic equipment tray and related methods are disclosed. The rotary locking apparatus may be a torsional rotary locking apparatus. The torsional rotary locking apparatus includes a rod having at least one protrusion and a torsion spring attached to the rod. The torsion spring may also be attached to a tray mount on the fiber optic equipment tray. The rod can be rotatably actuated such that the at least one protrusion selectively engages or disengages one or more of a plurality of slots in a tray guide to allow the fiber optic equipment tray to move from a closed to an open position. The torsion spring may be configured to lock the fiber optic equipment tray in either the open or the closed position when the at least one protrusion engages one of the plurality of slots in the tray guide.

30 Claims, 12 Drawing Sheets

(56) References Cited

U.S. PATENT DOCUMENTS

| | | | |
|---|---|---|---|
| 4,457,482 A | | 7/1984 | Kitagawa |
| 4,525,012 A | * | 6/1985 | Dunner .................. 312/222 |
| 4,597,173 A | * | 7/1986 | Chino et al. .................. 29/741 |
| 4,611,875 A | | 9/1986 | Clarke et al. |
| 4,645,292 A | | 2/1987 | Sammueller |
| 4,657,340 A | | 4/1987 | Tanaka et al. |
| 4,702,551 A | | 10/1987 | Coulombe |
| 4,736,100 A | | 4/1988 | Vastagh |
| 4,744,629 A | | 5/1988 | Bertoglio et al. |
| 4,747,020 A | | 5/1988 | Brickley et al. |
| 4,752,110 A | | 6/1988 | Blanchet et al. |
| 4,787,706 A | | 11/1988 | Cannon, Jr. et al. |
| 4,792,203 A | | 12/1988 | Nelson et al. |
| 4,798,432 A | | 1/1989 | Becker et al. |
| 4,808,774 A | | 2/1989 | Crane |
| 4,824,193 A | | 4/1989 | Maeda et al. |
| 4,824,196 A | | 4/1989 | Bylander |
| 4,826,277 A | | 5/1989 | Weber et al. |
| 4,838,643 A | | 6/1989 | Hodges et al. |
| 4,865,280 A | | 9/1989 | Wollar |
| 4,898,448 A | | 2/1990 | Cooper |
| 4,900,123 A | | 2/1990 | Barlow |
| 4,911,662 A | | 3/1990 | Debortoli et al. |
| 4,948,220 A | | 8/1990 | Violo et al. |
| 4,949,376 A | | 8/1990 | Nieves et al. |
| 4,971,421 A | | 11/1990 | Ori |
| 4,991,928 A | | 2/1991 | Zimmer |
| 4,995,688 A | | 2/1991 | Anton et al. |
| 5,001,602 A | | 3/1991 | Suffi et al. |
| 5,005,941 A | | 4/1991 | Barlow et al. |
| 5,017,211 A | | 5/1991 | Wenger et al. |
| 5,023,646 A | | 6/1991 | Ishida et al. |
| 5,024,498 A | | 6/1991 | Becker et al. |
| 5,028,114 A | | 7/1991 | Krausse et al. |
| 5,037,175 A | | 8/1991 | Weber |
| 5,048,918 A | | 9/1991 | Daems et al. |
| 5,066,149 A | | 11/1991 | Wheeler et al. |
| 5,067,784 A | | 11/1991 | Debortoli et al. |
| 5,071,211 A | | 12/1991 | Debortoli et al. |
| 5,071,220 A | | 12/1991 | Ruello et al. |
| 5,073,042 A | | 12/1991 | Mulholland et al. |
| 5,074,635 A | | 12/1991 | Justice et al. |
| 5,076,688 A | | 12/1991 | Bowen et al. |
| 5,080,459 A | | 1/1992 | Wettengel et al. |
| 5,100,221 A | | 3/1992 | Carney et al. |
| 5,104,336 A | | 4/1992 | Hatanaka et al. |
| 5,125,060 A | | 6/1992 | Edmundson |
| 5,127,082 A | | 6/1992 | Below et al. |
| 5,127,851 A | | 7/1992 | Hilbert et al. |
| 5,129,030 A | | 7/1992 | Petrunia |
| 5,133,039 A | | 7/1992 | Dixit |
| 5,138,678 A | | 8/1992 | Briggs et al. |
| 5,138,688 A | | 8/1992 | Debortoli |
| 5,142,598 A | | 8/1992 | Tabone |
| 5,142,607 A | | 8/1992 | Petrotta et al. |
| 5,150,277 A | | 9/1992 | Bainbridge et al. |
| D330,368 S | | 10/1992 | Bourgeois et al. |
| 5,152,760 A | | 10/1992 | Latina |
| 5,153,910 A | | 10/1992 | Mickelson et al. |
| 5,157,749 A | | 10/1992 | Briggs et al. |
| 5,167,001 A | | 11/1992 | Debortoli et al. |
| 5,170,452 A | | 12/1992 | Ott |
| 5,189,723 A | | 2/1993 | Johnson et al. |
| 5,204,929 A | | 4/1993 | Machall et al. |
| 5,209,572 A | | 5/1993 | Jordan |
| 5,214,735 A | | 5/1993 | Henneberger et al. |
| 5,224,186 A | | 6/1993 | Kishimoto et al. |
| 5,231,687 A | | 7/1993 | Handley |
| 5,231,688 A | | 7/1993 | Zimmer |
| 5,233,674 A | | 8/1993 | Vladic |
| 5,239,609 A | | 8/1993 | Auteri |
| 5,243,679 A | | 9/1993 | Sharrow et al. |
| 5,253,320 A | | 10/1993 | Takahashi et al. |
| 5,260,957 A | | 11/1993 | Hakimi et al. |
| 5,261,633 A | | 11/1993 | Mastro |
| 5,265,187 A | | 11/1993 | Morin et al. |
| 5,274,731 A | | 12/1993 | White |
| 5,280,138 A | | 1/1994 | Preston et al. |
| 5,285,515 A | | 2/1994 | Milanowski et al. |
| 5,315,679 A | | 5/1994 | Baldwin et al. |
| 5,317,663 A | | 5/1994 | Beard et al. |
| 5,323,478 A | | 6/1994 | Milanowski et al. |
| 5,323,480 A | | 6/1994 | Mullaney et al. |
| 5,333,193 A | | 7/1994 | Cote et al. |
| 5,333,221 A | | 7/1994 | Briggs et al. |
| 5,333,222 A | | 7/1994 | Belenkiy et al. |
| 5,337,400 A | | 8/1994 | Morin et al. |
| 5,339,379 A | | 8/1994 | Kutsch et al. |
| 5,347,603 A | | 9/1994 | Belenkiy et al. |
| 5,353,367 A | | 10/1994 | Czosnowski et al. |
| 5,359,688 A | | 10/1994 | Underwood |
| 5,363,466 A | | 11/1994 | Milanowski et al. |
| 5,363,467 A | | 11/1994 | Keith |
| 5,366,388 A | | 11/1994 | Freeman et al. |
| 5,367,598 A | | 11/1994 | Devenish, III et al. |
| 5,373,421 A | | 12/1994 | Detsikas et al. |
| 5,383,051 A | | 1/1995 | Delrosso et al. |
| 5,390,272 A | | 2/1995 | Repta et al. |
| 5,398,295 A | | 3/1995 | Chang et al. |
| 5,398,820 A | | 3/1995 | Kiss |
| 5,399,814 A | | 3/1995 | Staber et al. |
| 5,401,193 A | | 3/1995 | Lo Cicero et al. |
| 5,402,515 A | | 3/1995 | Vidacovich et al. |
| 5,408,557 A | | 4/1995 | Hsu |
| RE34,955 E | | 5/1995 | Anton et al. |
| 5,412,751 A | | 5/1995 | Siemon et al. |
| 5,416,837 A | | 5/1995 | Cote et al. |
| 5,418,874 A | | 5/1995 | Carlisle et al. |
| 5,420,956 A | | 5/1995 | Grugel et al. |
| 5,420,958 A | | 5/1995 | Henson et al. |
| 5,438,641 A | | 8/1995 | Malacarne |
| 5,442,725 A | | 8/1995 | Peng |
| 5,442,726 A | | 8/1995 | Howard et al. |
| 5,443,232 A | | 8/1995 | Kesinger et al. |
| 5,444,804 A | | 8/1995 | Yui et al. |
| 5,448,015 A | | 9/1995 | Jamet et al. |
| 5,450,518 A | | 9/1995 | Burek et al. |
| 5,458,019 A | | 10/1995 | Trevino |
| 5,471,555 A | | 11/1995 | Braga et al. |
| 5,479,505 A | | 12/1995 | Butler et al. |
| 5,481,634 A | | 1/1996 | Anderson et al. |
| 5,481,939 A | | 1/1996 | Bernardini |
| 5,490,229 A | | 2/1996 | Ghandeharizadeh et al. |
| 5,497,416 A | | 3/1996 | Butler, III et al. |
| 5,497,444 A | | 3/1996 | Wheeler |
| 5,511,144 A | | 4/1996 | Hawkins et al. |
| 5,511,798 A | | 4/1996 | Kawamoto et al. |
| 5,519,804 A | | 5/1996 | Burek et al. |
| 5,542,015 A | | 7/1996 | Hultermans |
| 5,546,495 A | * | 8/1996 | Bruckner et al. .............. 385/135 |
| 5,548,641 A | | 8/1996 | Butler et al. |
| 5,553,183 A | | 9/1996 | Bechamps |
| 5,553,186 A | | 9/1996 | Allen |
| 5,572,617 A | | 11/1996 | Bernhardt et al. |
| 5,575,680 A | | 11/1996 | Suffi |
| 5,577,151 A | | 11/1996 | Hoffer |
| 5,590,234 A | | 12/1996 | Pulido |
| 5,595,507 A | | 1/1997 | Braun et al. |
| 5,596,670 A | | 1/1997 | Debortoli et al. |
| 5,600,020 A | | 2/1997 | Wehle et al. |
| 5,602,954 A | | 2/1997 | Nolf et al. |
| 5,608,606 A | | 3/1997 | Blaney |
| 5,613,030 A | | 3/1997 | Hoffer et al. |
| 5,617,501 A | | 4/1997 | Miller et al. |
| 5,638,474 A | | 6/1997 | Lampert et al. |
| 5,640,476 A | | 6/1997 | Womack et al. |
| 5,640,482 A | | 6/1997 | Barry et al. |
| 5,647,043 A | | 7/1997 | Anderson et al. |
| 5,647,045 A | | 7/1997 | Robinson et al. |
| 5,650,334 A | | 7/1997 | Zuk et al. |
| 5,668,911 A | | 9/1997 | Debortoli |
| 5,671,273 A | | 9/1997 | Lanquist |
| 5,689,605 A | | 11/1997 | Cobb et al. |
| 5,689,607 A | | 11/1997 | Vincent et al. |

(56) References Cited

U.S. PATENT DOCUMENTS

| | | |
|---|---|---|
| 5,694,511 A | 12/1997 | Pimpinella et al. |
| 5,701,380 A | 12/1997 | Larson et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,758,003 A | 5/1998 | Wheeler et al. |
| 5,758,004 A | 5/1998 | Alarcon et al. |
| 5,761,026 A | 6/1998 | Robinson et al. |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A * | 6/2000 | Roth ............................... 385/76 |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 * | 11/2001 | LaGrotta et al. ............... 312/322 |
| 6,321,017 B1 | 11/2001 | Janus et al. |
| 6,322,279 B1 | 11/2001 | Yamamoto et al. |
| 6,325,549 B1 | 12/2001 | Shevchuk |
| RE37,489 E | 1/2002 | Anton et al. |
| 6,343,313 B1 | 1/2002 | Salesky et al. |
| 6,347,888 B1 | 2/2002 | Puetz |
| 6,353,696 B1 | 3/2002 | Gordon et al. |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,377,218 B1 | 4/2002 | Nelson et al. |
| 6,379,052 B1 | 4/2002 | De Jong et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |

(56) References Cited

U.S. PATENT DOCUMENTS

| | | |
|---|---|---|
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,934,456 B2 | 8/2005 | Ferris et al. |
| 6,937,807 B2 | 8/2005 | Franklin et al. |
| 6,944,383 B1 | 9/2005 | Herzog et al. |
| 6,944,389 B2 * | 9/2005 | Giraud et al. ................. 385/135 |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |

(56) References Cited

U.S. PATENT DOCUMENTS

| | | |
|---|---|---|
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,805,044 B2 | 9/2010 | Reagan et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,107,785 B2 | 1/2012 | Berglund et al. |
| 8,206,058 B2 | 6/2012 | Vrondran et al. |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0181918 A1 | 12/2002 | Spence et al. |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |

(56) References Cited

U.S. PATENT DOCUMENTS

| | | |
|---|---|---|
| 2005/0107086 A1 | 5/2005 | Tell et al. |
| 2005/0111809 A1* | 5/2005 | Giraud et al. .................. 385/135 |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1* | 2/2007 | Jiang et al. .................. 361/680 |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0127201 A1 | 6/2007 | Mertesdorf et al. |
| 2007/0131628 A1* | 6/2007 | Mimlitch et al. .................. 211/26 |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1* | 7/2008 | Smrha et al. .................. 385/135 |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1* | 8/2009 | Fransen et al. .................. 361/790 |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran De Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061691 A1 | 3/2010 | Murano et al. |
| 2010/0061693 A1 | 3/2010 | Bran De Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |

(56) References Cited

U.S. PATENT DOCUMENTS

| | | |
|---|---|---|
| 2010/0247051 A1 | 9/2010 | Kowalczyk et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0280537 A1 | 11/2011 | Cowen et al. |
| 2012/0051707 A1 | 3/2012 | Barnes et al. |
| 2012/0057838 A1 | 3/2012 | Hill et al. |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1777563 A1 | 4/2007 |
| FR | 2378378 A1 | 8/1978 |
| GB | 2241591 A | 9/1991 |
| GB | 2277812 A | 11/1994 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A * | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U * | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Non-Final Rejection mailed Sep. 7, 2010, for U.S. Appl. No. 12/323,423, 18 pages.

(56) References Cited

OTHER PUBLICATIONS

Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product pages, accessed Oct. 23, 2012, 2 page, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US2010/038986 mailed Aug. 18, 2010, 1 page.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.

(56) References Cited

OTHER PUBLICATIONS

Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
Non-Final Office Action for U.S. Appl. No. 12/953,039 mailed Jan. 11, 2013, 6 pages.
Non-Final Office Action for U.S. Appl. No. 12/952,912 mailed Dec. 28, 2012, 9 pages.
Non-Final Office Action for U.S. Appl. No. 12/953,118 mailed Jan. 7, 2013, 9 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-Final Office Action for U.S. Appl. No. 12/707,889 mailed Jan. 2, 2013, 7 pages.
Non-Final Office Action for U.S. Appl. No. 12/953,536 mailed Jan. 2, 2013, 20 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.

(56) References Cited

OTHER PUBLICATIONS

Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Final Office Action for U.S. Appl. No. 12/394,114 mailed Oct. 25, 2012, 8 pages.
Non-final Office Action for U.S. Appl. No. 12/732,487 mailed Sep. 19, 2012, 22 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/915,682 mailed Oct. 24, 2012, 8 pages.
Non-final Office Action for U.S. Appl. No. 12/946,139 mailed Jul. 26, 2012, 12 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
European Search Report for patent application 10790017.7 mailed Nov. 8, 2012, 7 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.

* cited by examiner

ROTARY LOCKING APPARATUS FOR FIBER OPTIC EQUIPMENT TRAYS AND RELATED METHODS

BACKGROUND

1. Field of the Disclosure

The technology of the disclosure relates to fiber optic modules and fiber optic equipment trays provided in fiber optic equipment to support and manage fiber optic connections.

2. Technical Background

Benefits of optical fiber include extremely high bandwidth and low noise transmission. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic connection equipment, which is also referred to as fiber optic equipment, is located in data distribution centers or central offices to support interconnections.

The fiber optic equipment is customized based on application need. The fiber optic equipment is typically included in housings that are mounted in equipment racks for organizational purposes and to optimize use of space. One example of such fiber optic equipment is a fiber optic module. A fiber optic module is designed to provide cable-to-cable fiber optic connections and manage the polarity of fiber optic cable connections. A fiber optic module may be mounted to a chassis or housing which is then mounted inside an equipment rack or cabinet. The chassis may be provided in the form of, or include, a tray that is extendable from the equipment rack like a drawer. This allows a technician access to fiber optic connections and the fiber optic modules mounted in the equipment rack without removing the fiber optic module from the equipment rack.

Even with advancements in access to the fiber optic modules, the labor associated with installing fiber optic modules and making optical connections is significant. For example, for a field technician to install a new fiber optic module, the field technician typically loads trunk cables in the rear section of a fiber optic equipment rack. The field technician then feeds the connectorized fanout legs from the trunk cable to the front of the equipment rack. The field technician then walks around to the front of the equipment rack to connect the fanout legs to a fiber optic module. It may be beneficial to be able to access fiber optic modules and fiber optic connections from both the front and the rear of the equipment rack. In addition, it would be advantageous to be able to load fiber optic modules and other equipment into a fiber optic equipment tray in the equipment rack without the fiber optic equipment tray sliding forward or backward. Otherwise, the force applied to fiber optic modules when establishing fiber optic connections can cause the fiber optic modules or other fiber optic equipment to be moved or be dislodged.

SUMMARY OF THE DETAILED DESCRIPTION

Embodiments disclosed in the detailed description include a rotary locking apparatus for locking a fiber optic equipment tray in both a locked and unlocked position. The fiber optic equipment tray can support fiber optic equipment, including but not limited to a fiber optic module. In one embodiment, the rotary locking apparatus is a torsional rotary locking apparatus. The torsional rotary locking apparatus can be locked to secure the fiber optic equipment tray about a chassis or other apparatus to prevent movement of the fiber optic equipment tray. In this manner, for example, the fiber optic equipment tray can withstand a force exerted when fiber optic modules or other equipment are loaded into the fiber optic equipment tray without the fiber optic equipment tray moving. The rotary locking apparatus can also be unlocked to allow the fiber optic equipment tray to be moved for access to fiber optic equipment supported therein.

In one embodiment, the torsional rotary locking apparatus may include a rod having at least one protrusion. A torsion spring may be attached to one end of the rod, and is configured to rotatably bias the rod. The torsion spring may also be attached to a tray mount that is disposed on the surface of the fiber optic equipment tray. The at least one protrusion can be configured to selectively engage one or more of a plurality of slots in a tray guide disposed on a chassis, where the tray guide is configured to receive the fiber optic equipment tray. The rod can be rotatably actuated such that the at least one protrusion selectively engages or disengages one or more of the plurality of slots in the tray guide. In one embodiment, the torsion spring is configured to lock the fiber optic equipment tray in a closed position when the at least one protrusion engages a first one of the plurality of slots in the tray guide. When the rod is rotatably actuated to allow the protrusion of the rod to be disengaged from a first one of the plurality of slots, the fiber optic equipment tray is movable in the chassis. In one embodiment, the torsion spring is further configured to lock the fiber optic equipment tray in an open position when the at least one protrusion engages a second one of the plurality of slots in the tray guide.

In another embodiment, a fiber optic apparatus is disclosed that comprises at least one tray guide disposed on a chassis, the at least one tray guide having a plurality of slots and configured to receive at least one fiber optic equipment tray having at least one tray mount. The at least one fiber optic equipment tray may include a rod having at least one protrusion, the at least one protrusion configured to selectively engage one or more of the plurality of slots in the tray guide and a torsion spring configured to attach to the rod and to the tray mount on the fiber optic equipment tray. The torsion spring is configured to lock the fiber optic equipment tray in a closed position when the at least one protrusion engages a first one of the plurality of slots in the tray guide. The rod is further configured to be rotatably actuated to allow the protrusion to be disengaged from a first one of the plurality of slots such that the fiber optic equipment tray is movable within the at least one tray guide. In one embodiment, there may be a plurality of tray guides and a plurality of corresponding fiber optic equipment trays. Each of the plurality of fiber optic equipment trays may have a rod with at least one protrusion and a torsion spring as set forth above.

In another embodiment, a method for selectively moving a fiber optic equipment tray using the torsional rotary locking apparatus is disclosed. The method comprises providing at least one tray guide disposed in a chassis, the at least one tray guide having a plurality of slots and configured to receive at least one fiber optic equipment tray. The fiber optic equipment tray may be locked in a closed position by at least one protrusion on a rod engaged in one of the plurality of slots in the tray guide. The rod is attached via a torsion spring to a mount on the least one fiber optic equipment tray and may be rotatably actuated such that the at least one protrusion on the rod is not engaged with one of the plurality of slots of the at least one tray guide. Once the protrusion is not engaged with one of the plurality of slots, the fiber optic equipment tray may be moved in either a forward or backward direction until the at least one protrusion is selectively engaged with one of the plurality of slots. In one embodiment, the method comprises rotatably actuating the rod by turning an actuator 90 degrees to release the at least one protrusion from one of the plurality of slots. In another embodiment, the method comprises releasing the actuator once the at least one protrusion is selectively engaged with the one or more of the plurality of slots.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE PREFERRED EMBODIMENTS

Reference will now be made in detail to the embodiments disclosed herein, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include a rotary locking apparatus for locking a fiber optic equipment tray in both a locked and unlocked position. The fiber optic equipment tray can support fiber optic equipment, including but not limited to a fiber optic module. In one embodiment, the rotary locking apparatus is a torsional rotary locking apparatus. The torsional rotary locking apparatus can be locked to secure the fiber optic equipment tray about a chassis or other apparatus to prevent movement of the fiber optic equipment tray. In this manner, for example, the fiber optic equipment tray can withstand a force exerted when fiber optic modules or other equipment are loaded into the fiber optic equipment tray without the fiber optic equipment tray moving. The rotary locking apparatus can also be unlocked to allow the fiber optic equipment tray to be moved for access to fiber optic equipment supported therein.

In one embodiment, a torsional rotary locking apparatus for locking a fiber optic equipment tray in both an open and a closed position is provided. The torsional rotary locking apparatus may include a rod having at least one protrusion. A torsion spring may be attached to one end of the rod, and is configured to rotatably bias the rod. The torsion spring may also be attached to a tray mount that is disposed on the surface of the fiber optic equipment tray. The at least one protrusion can be configured to selectively engage one or more of a plurality of slots in a tray guide disposed on a chassis, where the tray guide is configured to receive the fiber optic equipment tray. The rod can be rotatably actuated such that the at least one protrusion selectively engages or disengages one or more of the plurality of slots in the tray guide. In one embodiment, the torsion spring is configured to lock the fiber optic equipment tray in a closed position when the at least one protrusion engages a first one of the plurality of slots in the tray guide. When the rod is rotatably actuated to allow the protrusion of the rod to be disengaged from a first one of the plurality of slots, the fiber optic equipment tray is movable in the chassis. In one embodiment, the torsion spring is further configured to lock the fiber optic equipment tray in an open position when the at least one protrusion engages a second one of the plurality of slots in the tray guide.

Figure 1:
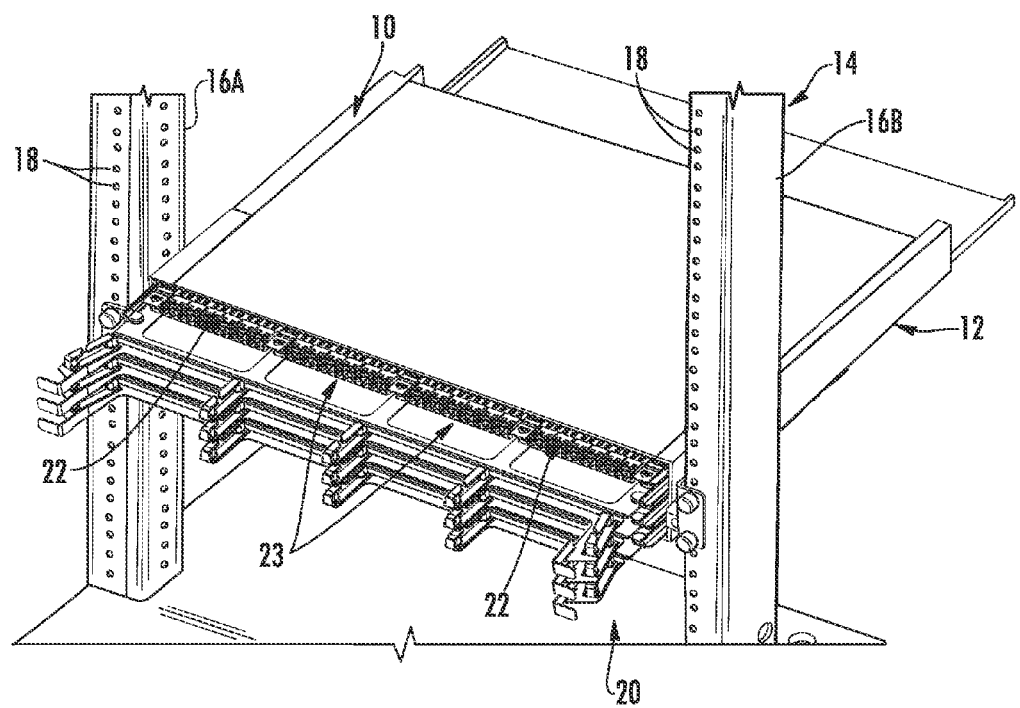
FIG. 1 is a front perspective view of an exemplary fiber optic equipment rack with an installed exemplary 1-U size chassis supporting high-density fiber optic modules to provide a given fiber optic connection density and bandwidth capability, according to one embodiment.

Before disclosing the torsional rotary locking apparatus in greater detail starting with FIG. 4 as discussed below, an exemplary fiber optic equipment environment in which the disclosed torsional rotary locking apparatus may be provided is first discussed with regard to FIGS. 1-3. In this regard, FIG. 1 illustrates an exemplary fiber optic equipment 10 from a front perspective view. The fiber optic equipment 10 supports high-density fiber optic modules that support a high fiber optic connection density and bandwidth in a 1-U or 1-RU space (U and RU hereinafter referred to as "U"), as will be described in greater detail below. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more fiber optic modules. However, the fiber optic equipment 10 could also be adapted to support one or more fiber optic patch panels or other fiber optic equipment that supports fiber optic components and connectivity.

The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the chassis 12 inside the fiber optic equipment rack 14. The chassis 12 is attached and supported by the fiber optic equipment rack 14 in the form of shelves that are stacked on top of each other within the vertical rails 16A, 16B. As illustrated, the chassis 12 is attached to the vertical rails 16A, 16B. The fiber optic equipment rack 14 may support 1-U or 1-RU-sized shelves, with "U" or "RU" equal to a standard 1.75 inches in height and nineteen (19) inches in width. In certain applications, the width of "U" may be twenty-three (23) inches. In this embodiment, the chassis 12 is 1-U in size; however, the chassis 12 could be provided in a size greater than 1-U as well.

As will be discussed in greater detail later below, the fiber optic equipment 10 includes a plurality of extendable fiber optic equipment trays 20 that each carries one or more fiber optic modules 22. The chassis 12 and fiber optic equipment trays 20 support fiber optic modules 22 that support high-density fiber optic modules and a fiber optic connection density and bandwidth connections in a given space, including in a 1-U space. FIG. 1 shows exemplary fiber optic components 23 disposed in the fiber optic modules 22 that support fiber optic connections. For example, the fiber optic components 23 may be fiber optic adapters or fiber optic connectors. As will also be discussed in greater detail later below, the fiber optic modules 22 in this embodiment can be provided such that the fiber optic components 23 can be disposed through a majority (at least eighty-five percent (85%) in one embodiment) of the width of the front side or face of the fiber optic module 22, as an example. The fiber optic components 23 can be disposed through a front opening of the fiber optic module 22. In one embodiment, the front opening may be approximately 90 millimeters (mm) or less. In one embodiment, a fiber optic connection density of at least one fiber optic connection per 7.0 mm of width of the front opening of the fiber optic modules 22 may be obtained for simplex or duplex fiber optic components 23. In this example, six (6) duplex or twelve (12) simplex fiber optic components 23 may be installed in each fiber optic module 22. The fiber optic equipment trays 20 in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if six (6) duplex fiber optic components 23 were disposed in each of the twelve (12) fiber optic modules 22 installed in fiber optic equipment trays 20 of the chassis 12 as illustrated in FIG. 1, a total of one hundred forty-four (144) fiber optic connections, or seventy-two (72) duplex channels (i.e., transmit and receive channels), would be supported by the chassis 12 in a 1-U space. If five (5) duplex fiber optic adapters are disposed in each of the twelve (12) fiber optic modules 22 installed in fiber optic equipment trays 20 of the chassis 12, a total of one hundred twenty (120) fiber optic connections, or sixty (60) duplex channels, would be supported by the chassis 12 in a 1-U space. The chassis 12 also supports at least ninety-eight (98) fiber optic components 23 in a 1-U space wherein at least one of the fiber optic components is a simplex or duplex fiber optic component 23.

If multi-fiber fiber optic components 23 were installed in the fiber optic modules 22, such as MPO components for example, higher fiber optic connection density and bandwidths would be possible over other chassis 12 that use similar fiber optic components 23. For example, if up to four (4) twelve (12) fiber MPO fiber optic components 23 were disposed in each fiber optic module 22, and twelve (12) of the fiber optic modules 22 were disposed in the chassis 12 in a 1-U space, the chassis 12 would support up to five hundred seventy-six (576) fiber optic connections in a 1-U space. If up to four (4) twenty-four (24) fiber MPO fiber optic components 23 were disposed in each fiber optic module 22, and twelve (12) of the fiber optic modules 22 were disposed in the chassis 12 in a 1-U space, the chassis 12 would support up to one thousand one hundred fifty-two (1152) fiber optic connections in a 1-U space.

Figure 2:
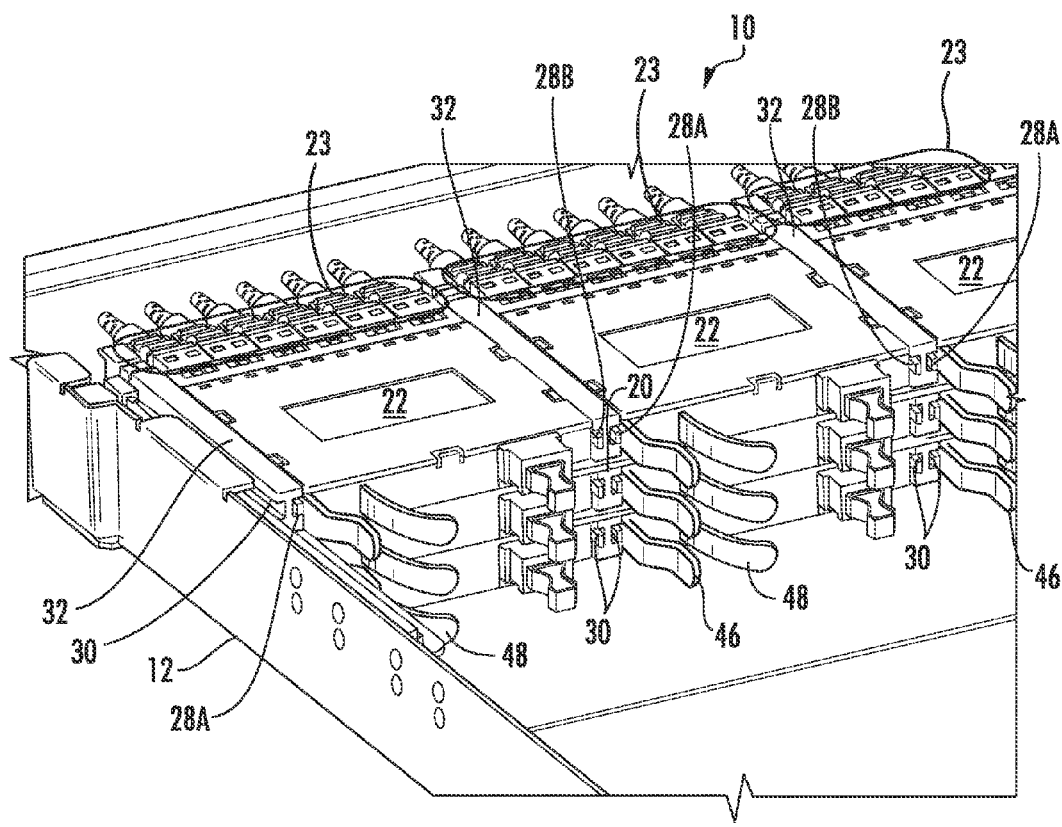
FIG. 2 is a rear perspective close-up view of the chassis of FIG. 1 with fiber optic modules installed in fiber optic equipment trays installed in the fiber optic equipment.

FIG. 2 is a rear perspective close-up view of the chassis 12 of FIG. 1 with fiber optic modules 22 loaded with fiber optic components 23 and installed in fiber optic equipment trays 20 installed in the chassis 12. Module rails 28A, 28B are disposed on each side of each fiber optic module 22. The module rails 28A, 28B are configured to be inserted within tray channels 30 of module rail guides 32 disposed in the fiber optic equipment tray 20, as illustrated in more detail in FIG. 3. Note that any number of module rail guides 32 can be provided. The fiber optic module 22 can be installed from both a front end 34 and a rear end 36 of the fiber optic equipment tray 20 in this embodiment. If it is desired to install the fiber optic module 22 in the fiber optic equipment tray 20 from the rear end 36, a front end 33 of the fiber optic module 22 can be inserted from the rear end 36 of the fiber optic equipment tray 20. More specifically, the front end 33 of the fiber optic module 22 is inserted into the tray channels 30 of the module rail guides 32. The fiber optic module 22 can then be pushed forward within the tray channels 30 until the fiber optic module 22 reaches the front end 34 of the fiber optic equipment tray 20. The fiber optic modules 22 can be moved towards the front end 34 until the fiber optic modules 22 reach a stop or locking feature disposed in the front end 34.

The fiber optic module 22 can be locked into place in the fiber optic equipment tray 20 by pushing the fiber optic module 22 forward to the front end 34 of the fiber optic equipment tray 20. A locking feature in the form of a front stop 38 is disposed in the module rail guides 32, as illustrated in FIG. 3. The front stop 38 prevents the fiber optic module 22 from extending beyond the front end 34. When it is desired to remove a fiber optic module 22 from the fiber optic equipment tray 20, a front module tab 40 also disposed in the module rail guides 32 and coupled to the front stop 38 can be pushed downward to engage the front stop 38. As a result, the front stop 38 will move downward away from the fiber optic module 22 such that the fiber optic module 22 is not obstructed from being pulled forward. The fiber optic module 22, and in particular its module rails 28A, 28B (FIG. 2), can be pulled forward along the module rail guides 32 to remove the fiber optic module 22 from the fiber optic equipment tray 20.

The fiber optic module 22 can also be removed from the rear end 36 of the fiber optic equipment tray 20. To remove the fiber optic module 22 from the rear end 36 of the fiber optic equipment tray 20, a latch 44 is disengaged by pushing a lever 46 (see FIGS. 2 and 3) inward towards the fiber optic module 22 to release the latch 44 from the module rail guide 32. To facilitate pushing the lever 46 inward towards the fiber optic module 22, a finger hook 48 is provided adjacent to the lever 46 so the lever 46 can easily be squeezed into the finger hook 48 by a thumb and index finger.

Figure 3:
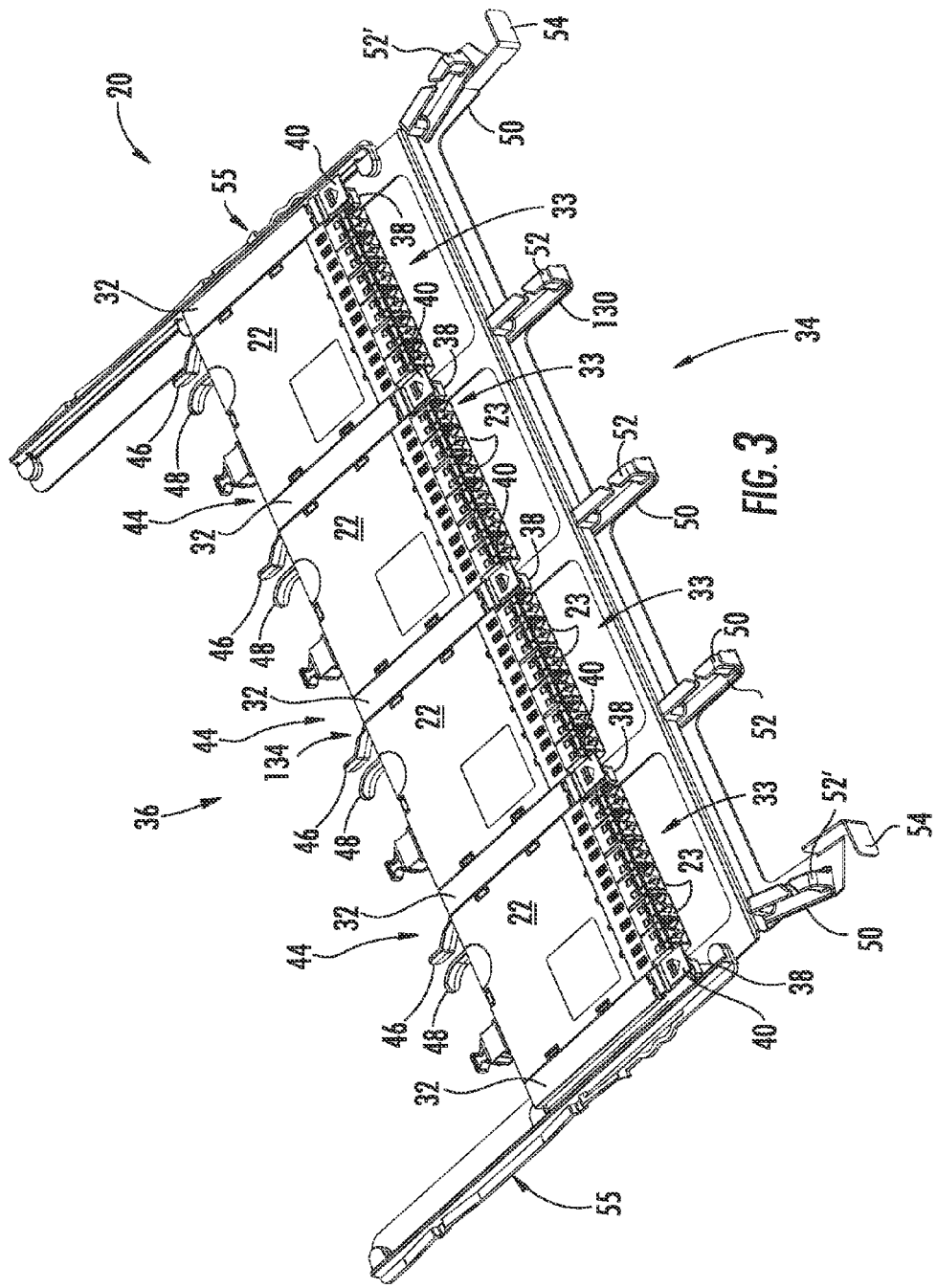
FIG. 3 is a front perspective view of one fiber optic equipment tray with installed fiber optic modules configured to be installed in the chassis of FIG. 1.

With continuing reference to FIG. 3, the fiber optic equipment tray 20 may also contain extension members 50. Routing guides 52 may be conveniently disposed on the extension members 50 to provide routing for optical fibers or fiber optic cables connected to fiber optic components 23 disposed in the fiber optic modules 22 (FIG. 3). The routing guides 52' on the ends of the fiber optic equipment tray 20 may be angled with respect to the module rail guides 32 to route optical fibers or fiber optic cables at an angle to the sides of the fiber optic equipment tray 20. Pull tabs 54 may also be connected to the extension members 50 to provide a means to allow the fiber optic equipment tray 20 to easily be pulled out from and pushed into the chassis 12.

As illustrated in FIG. 3, the fiber optic equipment tray 20 also contains tray rails 55. The tray rails 55 are configured to be received in tray guides 56 disposed in the chassis 12 to retain and allow the fiber optic equipment trays 20 to move in and out of the chassis 12, as seen in FIG. 4 and discussed in more detail below.

Figure 4:
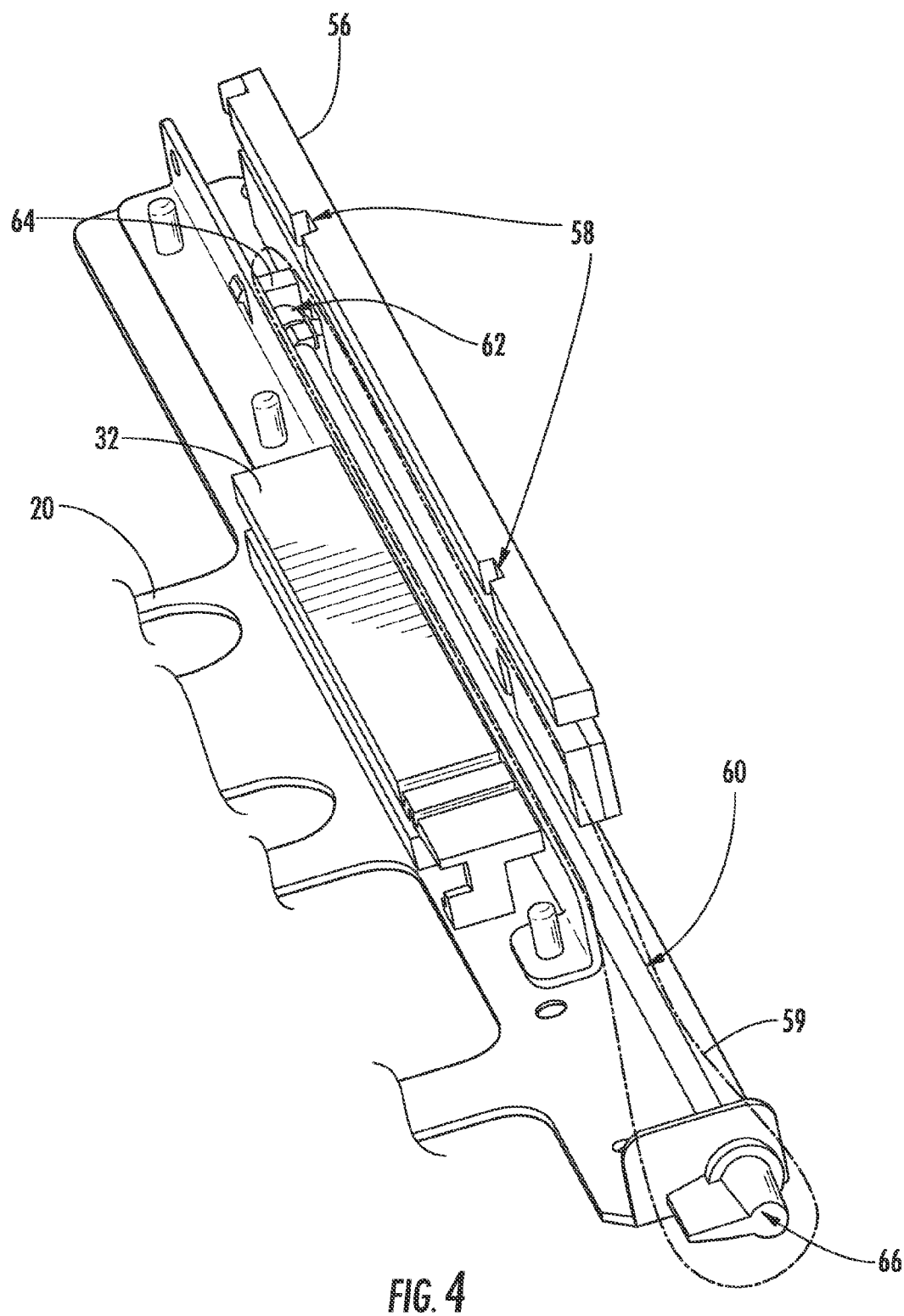
FIG. 4 is a close-up view of the fiber optic equipment tray of FIG. 3 with an exemplary torsional rotary locking apparatus.

FIG. 4 is a close-up view of the fiber optic equipment tray 20 of FIG. 3 with an exemplary torsional rotary locking apparatus 59. The fiber optic equipment tray 20 having a module rail guide 32 as discussed above in FIGS. 2 and 3 is shown. On the edge of the fiber optic equipment tray 20, outside the module rail guide 32, the torsional rotary locking apparatus 59 is provided. In this embodiment, the torsional rotary locking apparatus 59 includes a rod 60 having a torsion spring 62 on one end. The torsion spring 62 connects the rod 60 to a tray mount 64 attached to the bottom surface of the fiber optic equipment tray 20. The rod 60 extends through an opening in an end of the fiber optic equipment tray 20 and attaches to an actuator 66. In one embodiment, the actuator 66 may be a knob.

In order to lock the fiber optic equipment tray 20 in the open or closed position, the torsional rotary locking apparatus 59 shown in FIG. 4 may be used. In the closed position, a protrusion 68 of the rod 60 (as discussed more fully with respect to FIG. 5 below) is locked into one of the plurality of slots 58 on the tray guide 56. The torsion spring 62 maintains the rod 60 in the closed position. To open the fiber optic equipment tray 20, a technician can turn the rod 60 in order to unlock the torsional rotary locking apparatus 59. In one embodiment, this may be done by turning the actuator 66 far enough such that the protrusion 68 disengages from the slot 58. In another embodiment, the actuator 66 may be turned ninety (90) degrees in order to unlock the torsional rotary locking apparatus 59. Once the torsional rotary locking apparatus is unlocked, the fiber optic equipment tray 20 can move within the chassis. In one embodiment, the fiber optic equipment tray 20 also contains tray rails 55, which are configured to be received in tray guides 56 disposed in the chassis 12 to retain and allow the fiber optic equipment trays 20 to move in and out of the chassis 12.

In this embodiment, a tray guide 56 disposed in the chassis 12 is configured to receive the fiber optic equipment tray 20. The tray guide 56 may be composed of any material desired, including but not limited to a polymer, plastic, or metal. The tray guide 56 may have a plurality of slots 58 disposed along the length of the tray guide 56. In one embodiment, there are two slots 58, one slot corresponding to the fiber optic equipment tray 20 being in a closed position, and one slot corresponding to the fiber optic equipment tray 20 being in an open position. In one embodiment, the slots 58 may be detents disposed in the tray guides 56 to provide stopping or resting positions. The slots 58 may have chamfers or radii on the edges of the slots 58 in one embodiment. The fiber optic equipment trays 20 can be moved in and out of the chassis 12 by their tray rails 55 moving within the tray guides 56. In this manner, the fiber optic equipment trays 20 can be independently movable about the tray guides 56 in the chassis 12.

Although FIG. 4 shows only a single tray guide 56 on the right side of the fiber optic equipment tray 20, another tray guide 56 may be disposed on the left side of the fiber optic equipment tray 20. The tray guides 56 may be installed opposite and facing each other in the chassis 12 to provide complementary tray guides 56 for the tray rails 55 of the fiber optic equipment trays 20 received therein. If it is desired to access a particular fiber optic equipment tray 20 and/or a particular fiber optic module 22 in a fiber optic equipment tray 20, the pull tab 54 of the desired fiber optic equipment tray 20 can be pulled forward to cause the fiber optic equipment tray 20 to extend forward out from the chassis 12. The fiber optic module 22 can be removed from the fiber optic equipment tray 20 as previously discussed. When access is completed, the fiber optic equipment tray 20 can be pushed back into the chassis 12 wherein the tray rails 55 move within the tray guides 56 disposed in the chassis 12.

In order to be able to access the fiber optic modules 22 on the fiber optic equipment trays 20 from both the front and the rear of the chassis 12, it is desirable that the fiber optic equipment tray 20 slide in both directions, i.e., toward the front and toward the back of the chassis 12. In addition, it is desirable that the fiber optic equipment tray 20 be able to lock in both the open position (where the fiber optic equipment tray 20 has been pulled toward the front or rear of the chassis 12) and in the closed position. In the closed position, the fiber optic equipment tray 20 may be able to withstand a certain force such that a technician can load fiber optic modules 22 or other equipment, or install connectors into adapters in the fiber optic module 22, from the rear of the chassis 12 without fear of the fiber optic equipment trays 20 sliding forward. In the open position, the fiber optic equipment tray 20 may be able to withstand or resist a force consistent with installing fiber optic modules 22 or other equipment, or installing connectors into adapters in the fiber optic module 22, from the front of the chassis 12 without fear of the fiber optic equipment trays 20 sliding backward. In one embodiment, when installing connectors into adapters in the fiber optic module 22, this force may be six (6) to nine (9) pounds. In another embodiment, when loading fiber optic modules 22 into the tray channels 30 of the rail guides 32, this force may be two (2) to three (3) pounds. In order to address these different forces, a torsional rotary locking apparatus 59 as provided in FIG. 4 may be used to lock the fiber optic equipment tray 20 about the chassis 12 or other equipment and to allow the fiber optic equipment tray 20 to be moved in and out of the chassis 12 when unlocked. To provide a specific example of how a torsional rotary locking apparatus 59 as provided in FIG. 4 may be used to lock or unlock one or more fiber optic equipment trays 20, FIG. 5 is provided.

Figure 5:
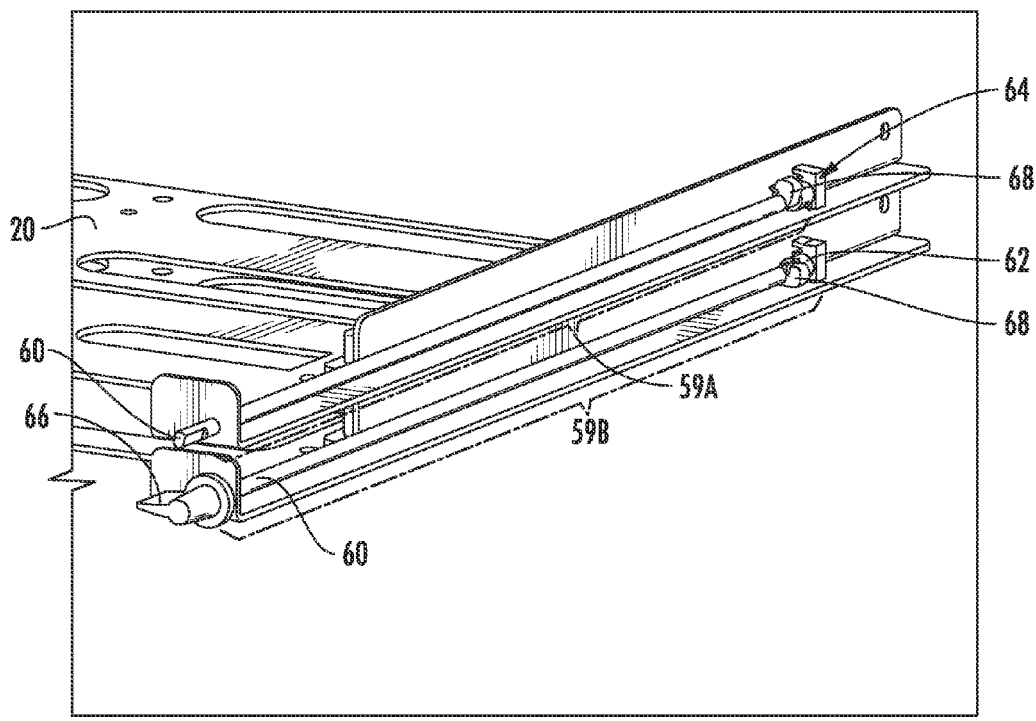
FIG. 5 is a side view of a pair of exemplary torsional rotary locking apparatuses for a pair of fiber optic equipment trays.

Referring now to FIG. 5, a side view of a pair of exemplary torsional rotary locking apparatuses 59A, 59B is shown for a pair of fiber optic equipment trays 20. In FIG. 5, two fiber optic equipment trays 20 are shown, each having a rod 60 having a torsion spring 62 at one end connected to a tray mount 64. Each of the rods 60 may have at least one protrusion 68 which is configured to be received by the slots 58 on the tray guides 56 (FIG. 4). Although each rod 60 in FIG. 5 is shown as having only one protrusion 68, each rod 60 may have more than one protrusion 68 in certain embodiments. In order to lock the fiber optic equipment tray 20 in the open or closed position, one of the torsional rotary locking apparatuses 59, 59A, or 59B shown in FIGS. 4 and 5 may be used. In the closed position, the protrusion 68 of the rod 60 is locked into one of the plurality of slots 58 on the tray guide 56. The torsion spring 62 maintains the rod 60 in the closed position. In the closed position, the torsion spring 62 and the protrusion 68 being in the slot 58 may be able to withstand a certain force such that a technician can load fiber optic modules 22 or other equipment from the rear of the chassis 12 without fear of the fiber optic equipment tray 20 sliding forward or backward.

To open the fiber optic equipment tray 20, a technician can turn the rod 60 in order to allow the protrusion 68 to disengage from the slot 58. In one embodiment, this may done by turning the actuator 66 ninety (90) degrees. FIG. 5 shows the position of the rod 60 and the protrusion 68 in both the open and closed positions, as seen in the different positioning of the protrusion 68 in the two fiber optic equipment trays 20 in FIG. 5, with the actuator 66 not being shown on the top fiber optic equipment tray 20 so that the turning of the rod 60 can be seen.

When the technician turns the rod 60 so that the protrusion 68 is released from the slot 58, the fiber optic equipment tray 20 may then be pulled forward toward the front of the chassis 12 or pushed backward toward the rear of the chassis 12 by the technician. In one embodiment, the fiber optic equipment tray 20 may be pushed backward until a positive stop 70 (see FIG. 8A) stops the fiber optic equipment tray 20 in the open position. In one embodiment, the positive stop 70 may be located toward the back of the fiber optic equipment tray 20 such that a fixed portion of the torsional rotary locking apparatus 59 will make contact with the positive stop 70 and the protrusion 68 can engage with one of the plurality of slots 58 in the tray guide 56. In this manner, the positive stop 70 will keep the fiber optic equipment tray 20 from being pushed completely out of the chassis 12.

Figure 8A:
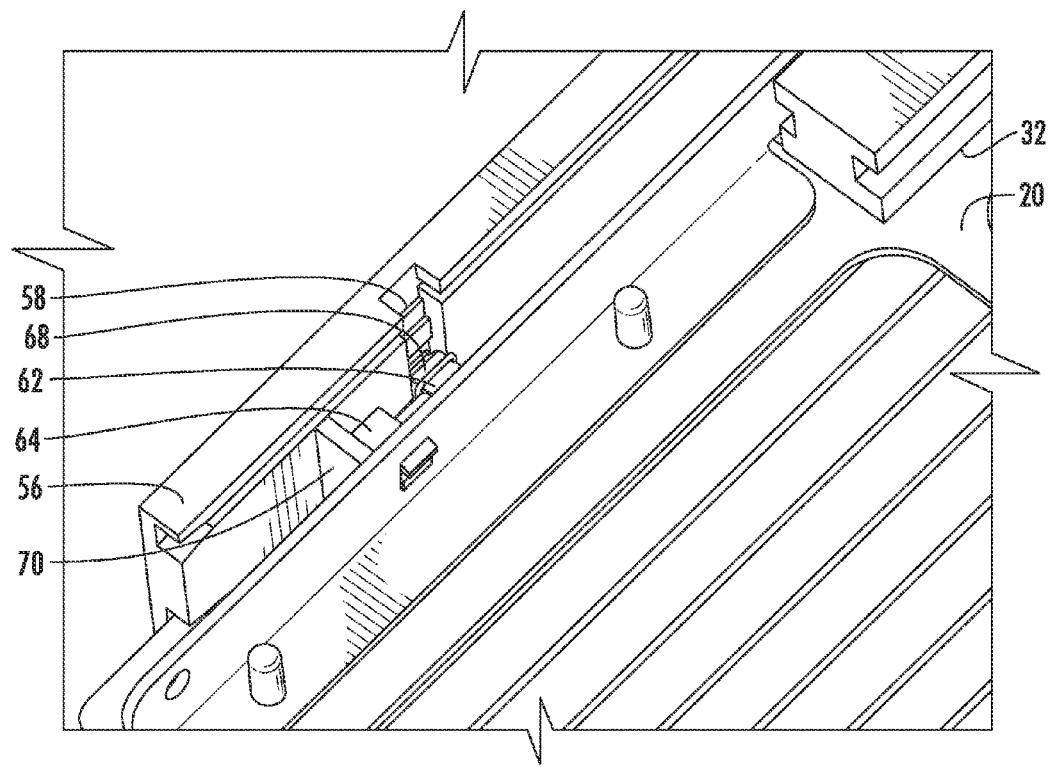
FIG. 8A is a top view of the exemplary torsional rotary locking apparatus of FIG. 4.
Figure 8B:
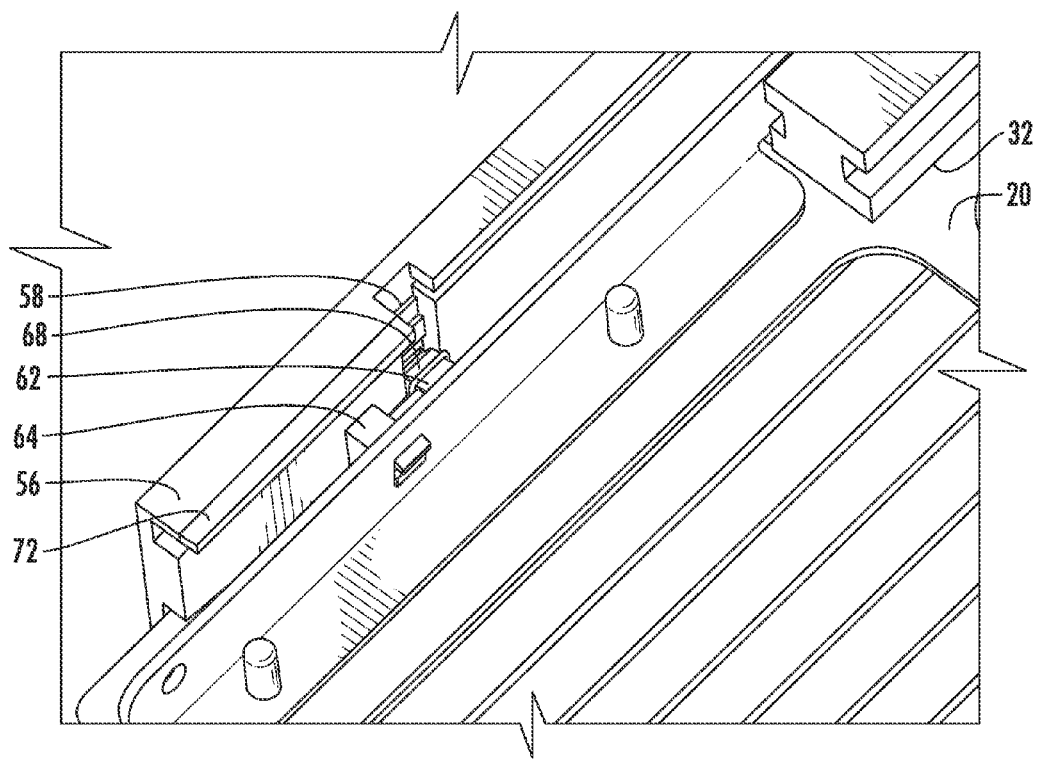
FIG. 8B is a top view of another exemplary torsional rotary locking apparatus of FIG. 4.

In another embodiment, shown in FIG. 8B, an overhang stop 72 may be added to an edge of the tray guide 56 in order to stop the fiber optic equipment tray 20 from being pushed completely out of the chassis 12. In the embodiment of FIG. 8B, the overhang stop 72 will stop the protrusion 68 of the rod 60 from going past the slot 58 when the fiber optic equipment tray 20 is being moved by the technician.

In either embodiment of FIG. 8A or FIG. 8B, when the positive stop 70 or the overhang stop 72 stops the fiber optic equipment tray 20, the technician may then release the actuator 66 and the protrusion 68 of the rod 60 can engage a second one of the plurality of slots 58 in the tray guide 56 in order to lock the fiber optic equipment tray 20 in the open position. In another embodiment, there may be a plurality of positive stops 70 and/or overhang stops 72. For example, there may be a positive stop 70 or a overhang stop 72 positioned toward the front of the fiber optic equipment tray 20 such that the fiber optic equipment tray 20 may be pulled forward until the positive stop 70 or overhang stop 72 stops the fiber optic equipment tray 20 in order to keep the fiber optic equipment tray 20 from being pulled completely out of the front of the chassis 12.

In one embodiment, a first one of the plurality of slots 58 and a second one of the plurality of slots 58 are spaced a certain fixed distance apart. In another embodiment, there may be more than two slots 58. In some embodiments, the distance between slots 58 may vary. The distance between the first and second slots 58 may be between 3 and 4 inches in one embodiment. In one embodiment, the distance between the first and second slots is 3.6 inches. When the protrusion 68 of the rod 60 fits into the second one of the plurality of slots 58 in the tray guide 56, the fiber optic equipment tray 20 is locked in the open position and the fiber optic equipment tray 20 may be able to resist a force consistent with installing fiber optic modules 22 or other equipment, or installing connectors into adapters in the fiber optic module 22, from the front of the chassis 12 without fear of the fiber optic equipment tray 20 sliding backward.

Figure 6:
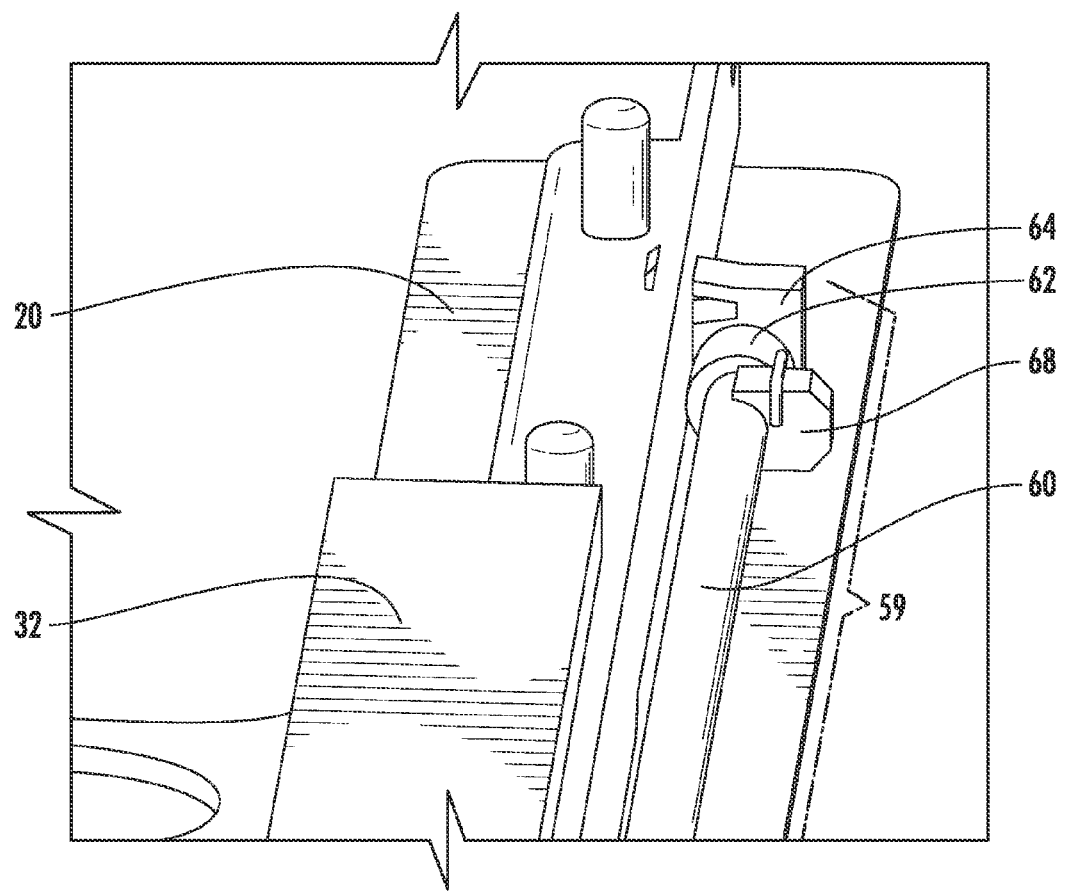
FIG. 6 is a close-up view of an exemplary rod, exemplary torsion spring, and exemplary tray mount of the exemplary torsional rotary locking apparatus of FIG. 4.

FIG. 6 is a close-up view of the tray mount 64 and the torsion spring 62 of the torsional rotary locking apparatus of FIG. 4. In one embodiment, the torsion spring 62 is attached at one end to the protrusion 68 of the rod 60. The torsion spring 62 is attached at the other end to the tray mount 64. In one embodiment, part of the torsion spring 62 may fit over the protrusion 68 of the rod 60. In this manner, when the rod 60 is rotated, the torsion spring 62 attached to the protrusion 68 will allow the protrusion 68 to also rotate and disengage from a slot 58 of the tray guide 56, as shown in more detail below in FIG. 7.

Figure 7:
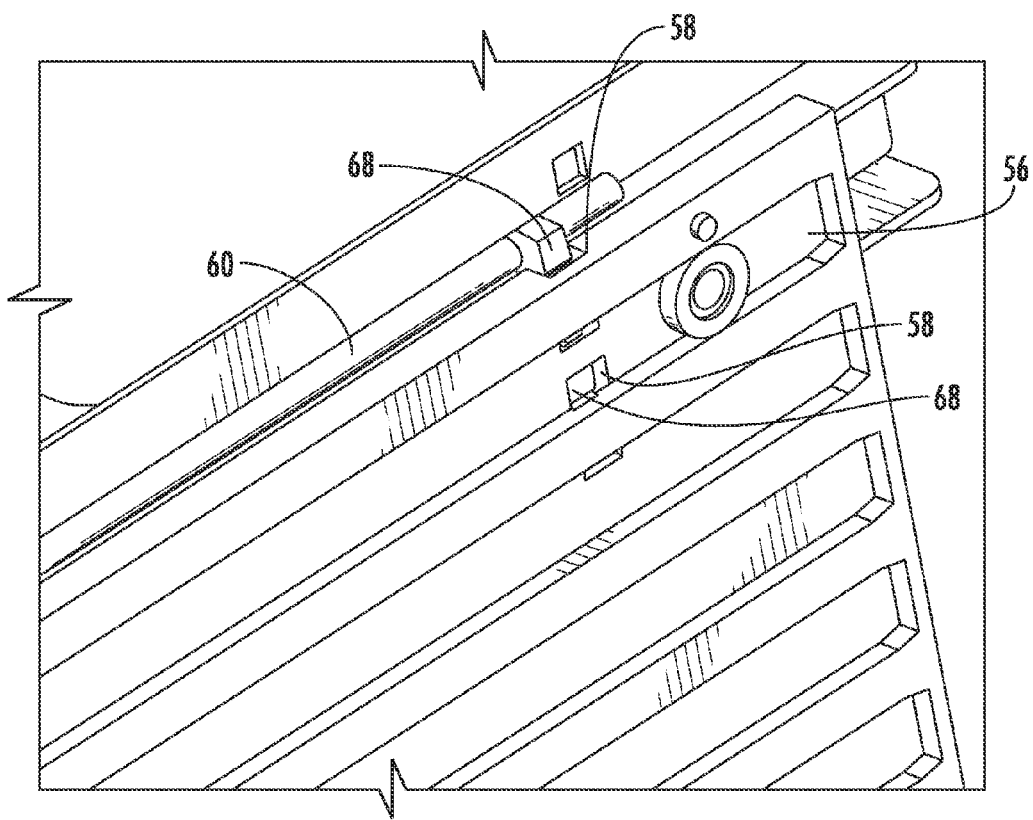
FIG. 7 is a close-up view of the exemplary torsional rotary locking apparatuses of FIG. 5 showing how a protrusion fits into an slot on a tray guide in one embodiment.

FIG. 7 is a close-up view of how the torsional rotary locking apparatuses of FIG. 5 fit into the slots 58 of the tray guides 56 in this embodiment. There are two (2) slots 58 labeled in FIG. 7. Looking at the slot 58 on the top of FIG. 7, the protrusion 68 of the rod 60 is about to engage or has just disengaged with the slot 58 of the tray guide 56, such that the fiber optic equipment tray 20 associated with this rod 60 would be movable within the tray guide 56. Looking at the second labeled slot 58 on the bottom of FIG. 7, the protrusion 68 of a second rod 60 (which is mostly hidden) is already engaged with the slot 58 of the tray guide 56, and the fiber optic equipment tray 20 associated with this protrusion 58 is locked into position.

Figure 9:
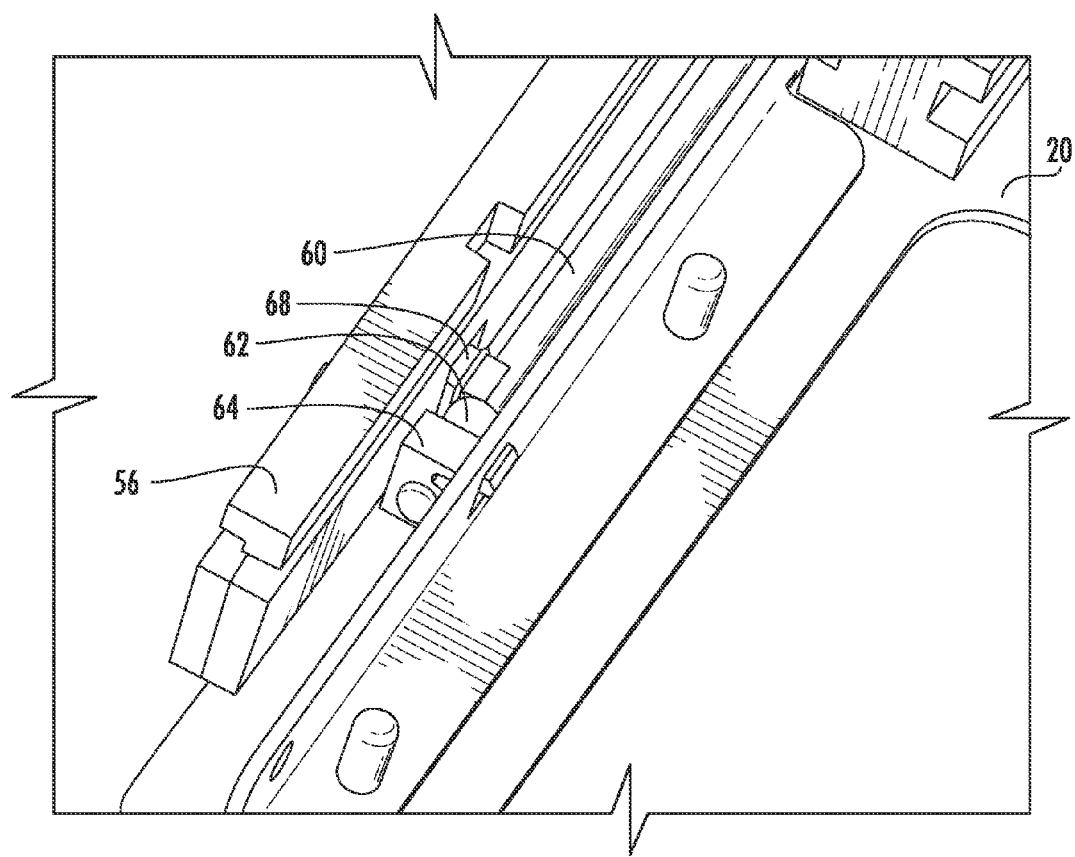
FIG. 9 is an alternate top view of the exemplary torsional rotary locking apparatus of FIG. 4.

FIGS. 8A, 8B, and 9 are top views of the torsional rotary locking apparatus of FIG. 4. In certain embodiments, as shown in FIGS. 8A and 8B, the torsion spring 62 is attached at one end to the protrusion 68. The torsion spring 62 is attached at the other end to the tray mount 64. The protrusion 68 fits into the slot 58 of the tray guide 56. Referring to FIG. 5 and either FIG. 8A or 8B together, when the technician turns the rod 60 (as shown in FIG. 5) so that the protrusion 68 is released from the slot 58, the fiber optic equipment tray 20 may then be pulled forward by the technician. In one embodiment, the fiber optic equipment tray 20 may be pulled forward until a front stop 70 stops the fiber optic equipment tray 20 in the open position. Referring to FIG. 5 and either FIG. 8A or 8B together, the technician may then release the actuator 66 and the protrusion 68 of the rod 60 can engage a second one of the plurality of slots 58 in tray guide 56 in order to lock the fiber optic equipment tray 20 in the open position. In one embodiment, as shown in FIG. 9, the rod 60 may extend through the tray mount 64.

In one embodiment, the length of the rod 60 may vary in order to provide different sliding distances for the fiber optic equipment tray 20. In addition, the diameter of the rod 60 may vary in one embodiment in order to provide improved stiffness. The rod 60 may be composed of various metals, polymers, or plastics. Further, in one embodiment, the force of the torsion spring 62 can vary.

Figure 10:
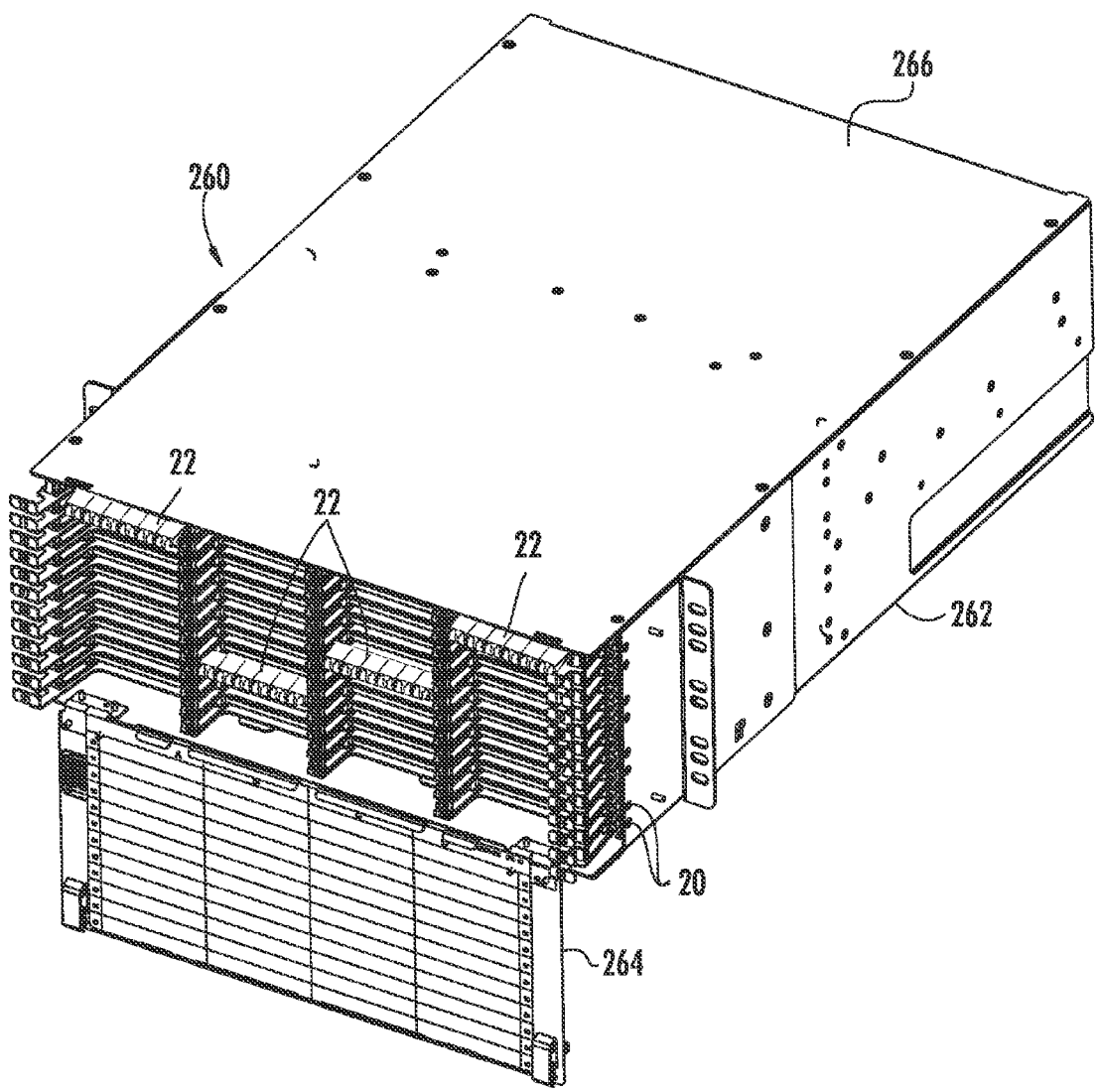
FIG. 10 is a front perspective view of an alternate exemplary 4-U size fiber optic chassis that can support the fiber optic equipment trays and fiber optic modules according to the fiber optic equipment trays and fiber optic modules disclosed herein.

FIG. 10 illustrates another embodiment of fiber optic equipment 260 that can include fiber optic equipment trays previously described above and illustrated to support fiber optic modules. The fiber optic equipment 260 in this embodiment includes a 4-U sized chassis 262 configured to hold fiber optic equipment trays each supporting one or more fiber optic modules. The supported fiber optic equipment trays may be any of the fiber optic equipment trays 20 previously described above. The supported fiber optic modules may be any of the fiber optic modules 22 previously described above. In this example, the chassis 262 is illustrated as supporting twelve (12) fiber optic equipment trays 20 each capable of supporting fiber optic modules 22.

Tray guides similar to the tray guides 56 described above may be used in the chassis 262 to support tray rails similar to the tray rails 55 of the fiber optic equipment trays 20 described above therein and to allow each fiber optic equipment tray 20 to be independently extended out from and retracted back into the chassis 262. A front door 264 is attached to the chassis 262 and is configured to close about the chassis 262 to secure the fiber optic equipment trays 20 contained in the chassis 262. A cover 266 is also attached to the chassis 262 to secure the fiber optic equipment trays 20. Up to twelve (12) fiber optic equipment trays 20 can be provided in the chassis 262. However, the fiber optic connection densities and connection bandwidths are still the same per 1-U space. The fiber optic connection densities and connection bandwidth capabilities have been previously described and are equally applicable for the chassis 262 of FIG. 10.

Using the torsional rotary locking apparatus disclosed herein allows the fiber optic equipment tray to be locked in both a closed position and in an open position. When the protrusion is locked in one of the plurality of slots on the tray guide, the torsion spring maintains the rod in the closed position such that the fiber optic equipment tray can withstand a force exerted when fiber optic modules or other equipment are loaded into the fiber optic equipment tray from the rear of the chassis without the fiber optic equipment tray sliding forward. When the rod is attached is rotatably actuated such that the at least one protrusion on the rod is not engaged with one of the plurality of slots in the at least one tray guide, the fiber optic equipment tray may be moved in either a forward or backward direction until the at least one protrusion is selectively engaged with one of the plurality of slots. In one embodiment, the fiber optic equipment tray may be pulled forward until the protrusion on the rod is engaged with one of the plurality of slots, which then locks the fiber optic equipment tray in the open position. In the locked open position, the fiber optic equipment tray can withstand a force exerted when fiber optic modules or other equipment are loaded into the fiber optic equipment tray from the front of the chassis without the fiber optic equipment tray sliding backward. In this manner, the disclosed torsional rotary locking apparatus allows for bidirectional movement of the fiber optic equipment tray between a locked closed position and a locked open position, such that the fiber optic equipment tray is accessible from both the front and the rear of the chassis. The disclosed torsional rotary locking apparatus is not dependent on pressure and does not degrade over time.

Many modifications and other embodiments besides the embodiments set forth herein will come to mind to one skilled in the art to which the disclosed embodiments pertain having the benefit of the teachings presented in the foregoing descriptions and the associated drawings. These modifications include, but are not limited to, number or type of fiber optic equipment, fiber optic module, fiber optic equipment tray, features included in the fiber optic equipment tray. Any size equipment, including but not limited to 1-U, 2-U and 4-U sizes may include some or all of the aforementioned features and fiber optic modules disclosed herein and some or all of their features. Further, the modifications are not limited to the type of fiber optic equipment tray or the means or device to support fiber optic modules installed in the fiber optic equipment trays. The fiber optic modules can include any fiber optic connection type, including but not limited to fiber optic connectors and adapters, and number of fiber optic connections, density, etc.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive, or bend resistant, optical fiber is ClearCurve® optical fiber, manufactured by Corning Incorporated. Suitable fibers of this type are disclosed, for example, in U.S. Patent Application Publication Nos. 2008/0166094 and 2009/0169163.

Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 11:
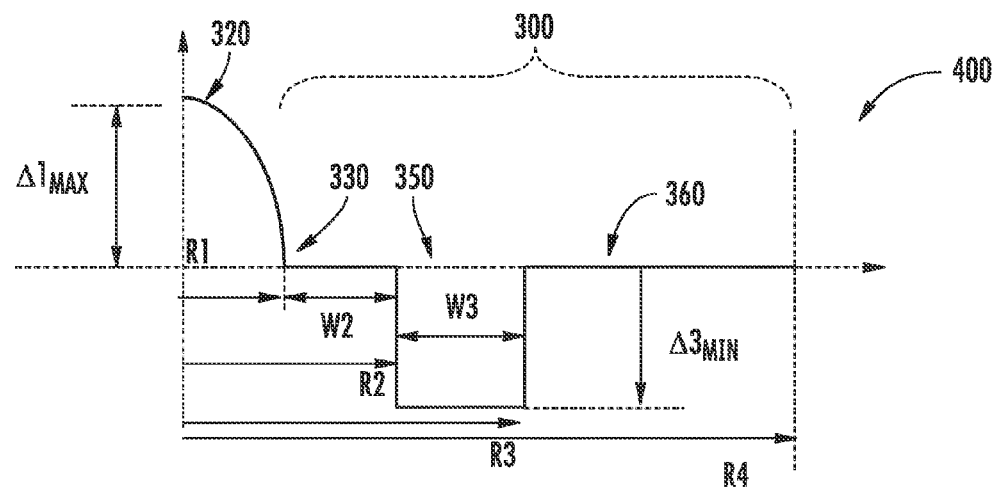
FIG. 11 shows a schematic representation (not to scale) of the refractive index profile of a cross-section of the glass portion of an exemplary embodiment of a multimode optical fiber disclosed herein wherein the depressed-index annular portion is offset from the core and is surrounded by an outer annular portion.
Figure 12:
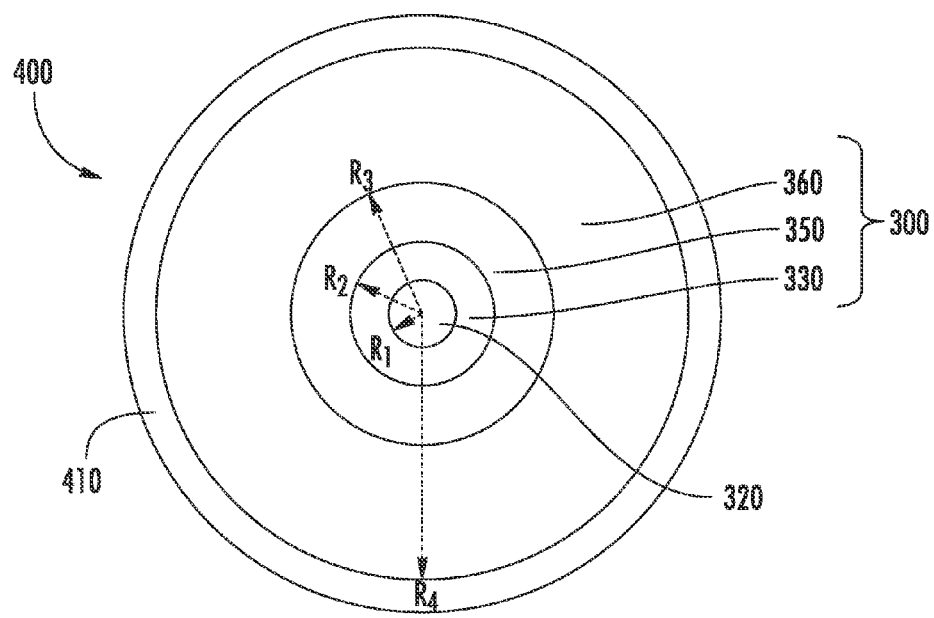
FIG. 12 is a schematic representation (not to scale) of a cross-sectional view of the optical waveguide fiber of FIG. 11.

FIG. 11 shows a schematic representation of the refractive index profile of a cross-section of the glass portion of an exemplary embodiment of a multimode optical fiber 400 comprising a glass core 320 and a glass cladding 300, the cladding comprising an inner annular portion 330, a depressed-index annular portion 350, and an outer annular portion 360. FIG. 12 is a schematic representation (not to scale) of a cross-sectional view of the optical waveguide fiber of FIG. 11. The core 320 has outer radius R1 and maximum refractive index delta Δ1MAX. The inner annular portion 330 has width W2 and outer radius R2. Depressed-index annular portion 350 has minimum refractive index delta percent Δ3MIN, width W3 and outer radius R3. The depressed-index annular portion 350 is shown offset, or spaced away, from the core 320 by the inner annular portion 330. The annular portion 350 surrounds and contacts the inner annular portion 330. The outer annular portion 360 surrounds and contacts the annular portion 350. The clad layer 300 is surrounded by at least one coating 410, which may in some embodiments comprise a low modulus primary coating and a high modulus secondary coating.

The inner annular portion 330 has a refractive index profile Δ2(r) with a maximum relative refractive index Δ2MAX, and a minimum relative refractive index Δ2MIN, where in some embodiments Δ2MAX=Δ2MIN. The depressed-index annular portion 350 has a refractive index profile Δ3(r) with a minimum relative refractive index Δ3MIN. The outer annular portion 360 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 330 has a substantially constant refractive index profile, as shown in FIG. 11 with a constant Δ2(r); in some of these embodiments, Δ2(r)=0%. In some embodiments, the outer annular portion 360 has a substantially constant refractive index profile, as shown in FIG. 11 with a constant Δ4(r); in some of these embodiments, Δ4(r)=0%. The core 320 has an entirely positive refractive index profile, where Δ1(r)>0%. R1 is defined as the radius at which the refractive index delta of the core first reaches value of 0.05%, going radially outwardly from the centerline. Preferably, the core 320 contains substantially no fluorine, and more preferably the core 320 contains no fluorine. In some embodiments, the inner annular portion 330 preferably has a relative refractive index profile Δ2(r) having a maximum absolute magnitude less than 0.05%, and Δ2MAX<0.05% and Δ2MIN>−0.05%, and the depressed-index annular portion 350 begins where the relative refractive index of the cladding first reaches a value of less than −0.05%, going radially outwardly from the centerline. In some embodiments, the outer annular portion 360 has a relative refractive index profile Δ4(r) having a maximum absolute magnitude less than 0.05%, and Δ4MAX<0.05% and Δ4MIN>−0.05%, and the depressed-index annular portion 350 ends where the relative refractive index of the cladding first reaches a value of greater than −0.05%, going radially outwardly from the radius where Δ3MIN is found.

Therefore, it is to be understood that the embodiments are not to be limited to the specific embodiments disclosed and that modifications and other embodiments are intended to be included within the scope of the appended claims. It is intended that the embodiments cover the modifications and variations provided they come within the scope of the appended claims and their equivalents. Although specific terms are employed herein, they are used in a generic and descriptive sense only and not for purposes of limitation.

What is claimed is:

1. A locking apparatus for a fiber optic apparatus, comprising:
   a rod having at least one protrusion configured to selectively engage one or more of a plurality of slots in a tray guide disposed on a chassis; and
   a torsion spring configured to attach to the rod and to a tray mounted on a fiber optic equipment tray disposed in the chassis along a first direction parallel to a longitudinal axis of the rod, and further configured to lock the fiber optic equipment tray in a closed position when the at least one protrusion engages a first one of the plurality of slots in the tray guide.

2. The locking apparatus of claim 1, wherein the rod is further configured to be rotatably actuated to allow the at least one protrusion to be disengaged from the first one of the plurality of slots in the tray guide such that the fiber optic equipment tray is movable in the chassis along the first direction.

3. The locking apparatus of claim 1, wherein the torsion spring is further configured to lock the fiber optic equipment tray in an open position when the at least one protrusion engages a second one of the plurality of slots in the tray guide.

4. The locking apparatus of claim 2 further comprising an actuator for rotating the rod such that the at least one protrusion is disengaged from the first one of the plurality of slots in the tray guide.

5. The locking apparatus of claim 4, wherein the actuator comprises a knob.

6. The locking apparatus of claim 1, wherein the rod has a plurality of protrusions.

7. The locking apparatus of claim 3 further comprising a front stop configured to stop the fiber optic equipment tray in the open position.

8. The locking apparatus of claim 2, wherein the fiber optic equipment tray is movable along the first direction both toward a front and toward a rear of the chassis.

9. The locking apparatus of claim 1, wherein the torsion spring is further configured to withstand a force when the fiber optic equipment tray is locked in the closed position such that fiber optic modules may be loaded from a rear of the chassis without the fiber optic equipment tray sliding forward.

10. The locking apparatus of claim 9, wherein the force is at least two (2) pounds.

11. The locking apparatus of claim 3, wherein the torsion spring is further configured to withstand a force when the fiber optic equipment tray is locked in the open position such that fiber optic modules may be loaded from a front of the chassis without the fiber optic equipment tray sliding backward.

12. The locking apparatus of claim 11, wherein the force is at least two (2) pounds.

13. The locking apparatus of claim 1, wherein at least two of the plurality of slots in the tray guide are spaced a fixed distance apart.

14. The locking apparatus of claim 13, wherein the fixed distance is between 3 and 4 inches.

15. A fiber optic apparatus, comprising:
at least one tray guide disposed in a chassis having a plurality of slots and configured to receive at least one fiber optic equipment tray along a first direction, the at least one fiber optic equipment tray having at least one tray mount;
a rod having a longitudinal axis parallel to the first direction and at least one protrusion, the at least one protrusion configured to selectively engage one or more of the plurality of slots in the at least one tray guide; and
a torsion spring configured to attach to the rod and to the at least one tray mount on the at least one fiber optic equipment tray, wherein the torsion spring is further configured to lock the at least one fiber optic equipment tray in a closed position when the at least one protrusion engages a first one of the plurality of slots in the at least one tray guide.

16. The fiber optic apparatus of claim 15, wherein the rod is further configured to be rotatably actuated to allow the at least one protrusion to be disengaged from the first one of the plurality of slots such that the at least one fiber optic equipment tray is movable along the first direction within the at least one tray guide.

17. The fiber optic apparatus of claim 15, further comprising at least one module rail guide disposed on the at least one fiber optic equipment tray and configured to receive at least one fiber optic module from a rear of the chassis along the first direction.

18. The fiber optic apparatus of claim 17, wherein the at least one fiber optic equipment tray is locked in the closed position due to the at least one protrusion engaging the first one of the plurality of slots in the at least one tray guide.

19. The fiber optic apparatus of claim 15, wherein the torsion spring is further configured to lock the at least one fiber optic equipment tray in an open position when the at least one protrusion engages a second one of the plurality of slots in the at least one tray guide.

20. The fiber optic apparatus of claim 19, further comprising at least one module rail guide disposed on the at least one fiber optic equipment tray and configured to receive at least one fiber optic module from a front of the chassis along the first direction.

21. The fiber optic apparatus of claim 20, wherein the at least one fiber optic equipment tray is locked in the open position due to the at least one protrusion engaging the second one of the plurality of slots in the at least one tray guide.

22. A fiber optic apparatus, comprising:
a plurality of tray guides disposed in a chassis, each of the plurality of tray guides having a plurality of slots and configured to receive a fiber optic equipment tray along a first direction;
a plurality of fiber optic equipment trays, each of the plurality of fiber optic equipment trays comprising:
a rod having a longitudinal axis parallel to the first direction and at least one protrusion, the at least one protrusion configured to selectively engage one or more of the plurality of slots of the tray guide;
a torsion spring configured to attach to the rod and to at least one tray mount disposed on the fiber optic equipment tray, wherein the torsion spring is further configured to lock the fiber optic equipment tray in a closed position when the at least one protrusion engages a first one of the plurality of slots in the tray guide; and
wherein the rod is further configured to be rotatably actuated to allow the at least one protrusion to be disengaged from the first one of the plurality of slots in the tray guide such that the fiber optic equipment tray is movable along the first direction within the at least one tray guide.

23. A method for selectively moving a fiber optic equipment tray, comprising:
providing at least one tray guide disposed in a chassis, the at least one tray guide having a plurality of slots and configured to receive at least one fiber optic equipment tray along a first direction;
rotatably actuating a rod attached via a torsion spring to a tray mount on the least one fiber optic equipment tray about a longitudinal axis of the rod parallel to the first direction such that at least one protrusion on the rod is not engaged with one of the plurality of slots in the at least one tray guide; and moving the at least one fiber optic equipment tray in the first direction until the at least one protrusion is selectively engaged with a first one of the plurality of slots in the at least one tray guide.

24. The method of claim 23, wherein rotatably actuating the rod further comprises turning an actuator to release the at least one protrusion from one of the plurality of slots in the at least one tray guide.

25. The method of claim 24, wherein the actuator is turned ninety (90) degrees.

26. The method of claim 24, further comprising releasing the actuator once the at least one protrusion is selectively engaged with the one or more of the plurality of slots in the at least one tray guide.

27. The method of claim 23, further comprising loading fiber optic modules in the at least one fiber optic equipment tray along the first direction when the at least one protrusion is selectively engaged with one or more of the plurality of slots in the at least one tray guide.

28. The method of claim 27, further comprising loading the fiber optic modules in the at least one fiber optic equipment tray along the first direction from a front of the chassis.

29. The method of claim 27, further comprising loading fiber optic modules in the at least one fiber optic equipment tray along the first direction from a rear of the chassis.

30. The method of claim 23, further comprising moving the at least one fiber optic equipment tray in a second along the first direction until the at least one protrusion is selectively engaged with a second one of the plurality of slots in the at least one tray guide.

* * * * *